US006567570B1

(12) United States Patent
Steinle et al.

(10) Patent No.: US 6,567,570 B1
(45) Date of Patent: May 20, 2003

(54) OPTICAL IMAGE SCANNER WITH INTERNAL MEASUREMENT OF POINT-SPREAD FUNCTION AND COMPENSATION FOR OPTICAL ABERRATIONS

(75) Inventors: Michael J. Steinle, Fort Collins, CO (US); Dan S. Johnson, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/183,304

(22) Filed: Oct. 30, 1998

(51) Int. Cl.[7] .................................................. G06K 9/20
(52) U.S. Cl. ....................................................... 382/312
(58) Field of Search ................................ 382/321, 254, 382/302, 278, 276, 322, 323; 358/401, 227, 471; 348/241, 349

(56) References Cited

U.S. PATENT DOCUMENTS

| 4,602,348 | A | | 7/1986 | Hart ........................... 364/581 |
|---|---|---|---|---|
| 5,307,175 | A | | 4/1994 | Seachman .................... 358/401 |
| 5,535,291 | A | * | 7/1996 | Spencer et al. ............. 382/254 |
| 5,627,918 | A | * | 5/1997 | Carasso ....................... 382/254 |
| 5,661,816 | A | * | 8/1997 | Fantone et al. ............. 382/100 |
| 5,751,863 | A | * | 5/1998 | Farr ............................. 382/275 |
| 6,148,117 | A | * | 11/2000 | Lopez et al. ................. 382/279 |

OTHER PUBLICATIONS

"Restoration of a Single Superresolution Image from Several Blurred, Noisy, and Undersampled Measured Images" by Michael Elad and Arie Feuer. IEEE Transactions on Image Processing. vol. 6, No. 12. Dec. 1997.

Digital Image Processing by Kenneth R. Castleman. copyright 1996 by Prentice–Hall, Inc. Chapter 16 entitled, "Image Restoration". pp. 387–430.

* cited by examiner

Primary Examiner—Andrew W. Johns
Assistant Examiner—Duy M. Dang
(74) Attorney, Agent, or Firm—Augustus W. Winfield

(57) ABSTRACT

An image scanner uses optical targets within the scanner to characterize imperfections of a lens system and to partially compensate for the imperfections using digital image processing. In one sample embodiment, a series of two-dimensional optical targets are placed outside the document scanning area. Each individual target is suitable for obtaining an estimate of the point-spread function for a small segment of the scan line. Each point-spread function is then used to compute a convolution kernel for the corresponding segment of the scan line. Alternatively, each point-spread function may be used in an iterative solution for a modified image. In an alternative embodiment, a two-dimensional known random pattern is provided for a target. Cross-correlation of a portion of the known random pattern with the scanned image of the same portion of known random pattern provides an estimate of the point-spread function for the portion of the scan line corresponding to the portion of the known random pattern. Providing a series of targets or continuous random target over the width of the scan line, within the scanner, enables determination of the point-spread function as a function of position for an assembled lens, at the humidity and temperature appropriate for the scan. As a result, a smaller, lower cost lens can be used and some the lens aberrations can be removed from the final scanned image.

8 Claims, 3 Drawing Sheets

OPTICAL IMAGE SCANNER WITH INTERNAL MEASUREMENT OF POINT-SPREAD FUNCTION AND COMPENSATION FOR OPTICAL ABERRATIONS

FIELD OF INVENTION

This invention relates generally to optical systems used in image scanners, digital copiers, facsimile machines, and similar devices and more specifically to compensation of optical aberrations after measuring, within the scanner, in near real-time, the point-spread function of the optical system.

BACKGROUND OF THE INVENTION

Image scanners convert a visible image on a document or photograph, or an image in a transparent medium, into an electronic form suitable for copying, storing or processing by a computer. An image scanner may be a separate device or an image scanner may be a part of a copier, part of a facsimile machine, or part of a multipurpose device. Reflective image scanners typically have a controlled source of light, and light is reflected off the surface of a document, through an optics system, and onto an array of photosensitive devices. The photosensitive devices convert received light intensity into an electronic signal. Transparency image scanners pass light through a transparent image, for example a photographic positive slide, through an optics system, and then onto an array of photosensitive devices.

In general, image scanners use an optical lens system or optical waveguide system to focus an image onto an array of photosensors. Lens systems and optical waveguide systems are subject to various optical aberrations such as spherical aberration, coma, astigmatism, field curvature, chromatic aberration, motion blur, and stray reflections (ghosting). Aberrations may be reduced by making the optical systems more precise and more complex, which in turn typically increases cost, size and weight. There is need for overall system cost reduction and size reduction by enabling use of relatively simple and low cost optical systems.

Some known, fixed, aberrations may be removed by geometric calibration. For example, an image of a grid of dots may be used to determine spatial pixel translations for images generated by fisheye lenses. Other compensation for some types of aberrations may be determined by using a mathematical model of the lens and optical design software.

Another method for compensation of optical aberration involves linear system theory and the impulse response of the system. In optical systems, the impulse response, or the image of a bright point object against a dark background, is called the point-spread function. The two-dimensional Fourier transform of the spatial domain point-spread function is called the optical transfer function. The frequency domain optical transfer function includes magnitude and phase. A two dimensional, magnitude only, vertical slice through the optical transfer function is called the modulation transfer function. If an image is blurred by an optical system, some blurring can be removed in the frequency domain by dividing the transform of the blurred image by the optical transfer function for the same imperfect optics. Convolution in the spatial domain is equivalent to multiplication in the frequency domain. Accordingly, as an alternative, some blurring may be removed in the spatial domain by convolution with an appropriate two-dimensional kernel computed from the point-spread function. Because of aliasing, and because of possible desired trade-offs between signal-to-noise and image sharpening, the desired modulation transfer function may have a lower frequency response than an ideal modulation transfer function based on a response to a true impulse.

Typically, determination of aberrations using a mathematical model of a lens, or determination of the point-spread function, is performed as a one-time calibration for on-axis imaging. However, the point-spread function of a lens may vary with manufacturing processes, may vary over time, may vary with temperature and humidity, and may vary with the locations of the image focal plane and the object focal plane. If an optical system is substantially different than a computer model, or if the lens system changes after determination of the point-spread function, a resulting filtering operation to compensate for aberrations may further degrade the image instead of reducing image degradation.

In particular, some low cost plastic lenses are relatively sensitive to temperature. It is common for an image scanner to include a lamp that radiates substantial heat. Copiers and multi-purpose devices may also include heaters for fusing toner onto paper or for drying ink. Before scanning is requested, lamps and heaters may be off or in a low-power standby condition. During scanning, the internal temperature of the image scanner may change substantially over a period of time that is long relative to the time required to scan a single image. In addition, for compact product size, image scanning lens systems typically focus on a document that is relatively close to the lens and therefore must be accurate over a wide field of view. Some aberrations, for example, astigmatism, coma, curvature of field are spatially variant. Therefore, a single kernel determined once for on-axis viewing may not be adequate for a lens system in an image scanner.

There is a need within image scanning products for simple, low cost, rapid characterization of aberrations, and compensation for aberrations, within a completed product. In addition, there is a need to compensate for aberrations, within scanning products, that vary spatially across the field of view of the lens. In addition, there is a need to determine the required compensation before each scan to accommodate changes in temperature, humidity, and other time varying factors. Finally, there is a need to monitor aberrations during a scan and to rescan if necessary.

SUMMARY OF THE INVENTION

A goal of the present application is to characterize the imperfections of a lens system in an image scanner, and to make the measurements within the scanner in near real time, and to partially compensate for the imperfections using digital image processing. In one example embodiment, a series of two-dimensional optical targets are placed outside the document scanning area. The targets extend over the entire length of the scan line to enable compensation across the field of view of the lens system. In a variation, targets are also positioned alongside the document to enable monitoring of compensation during a scan.

Each individual target is suitable for obtaining an estimate of the optical transfer function for a small segment of the scan line. One example target has step functions in intensity (white-to-black or black-to-white) at multiple angles. Each step function is suitable for obtaining an estimate for one modulation transfer function. The aggregate of the multiple modulation transfer functions for one individual target is used to estimate the optical transfer function for the viewing angle corresponding to the spatial location of the individual target.

In an alternative embodiment, a two-dimensional known random pattern is provided for a target. Cross-correlation of a portion of the known random pattern with the scanned image of the same portion of known random pattern provides an estimate of the point-spread function for the portion of the scan line corresponding to the portion of the known random pattern.

Each individual optical transfer function is then used to compensate for optical aberrations. In one embodiment, the optical transfer function is used to compute a convolution kernel for the corresponding segment of the scan line. The scanned image pixels within each segment of the scan line are convolved with a kernel appropriate for the segment. In an alternative embodiment, an iterative solution is used to compute a compensated image.

Providing a series of targets, or a continuous random target over the width of the scan line, within the scanner, enables determination of the optical transfer function, as a function of position for an assembled lens, at the humidity and temperature appropriate for the scan. Additional targets alongside a document enable ongoing verification during a scan. As a result, a smaller, lower cost lens can be used and some image degradation can be removed from the final scanned image.

DETAILED DESCRIPTION OF THE PREFERRED EMBODIMENT OF THE INVENTION

Figure 1:
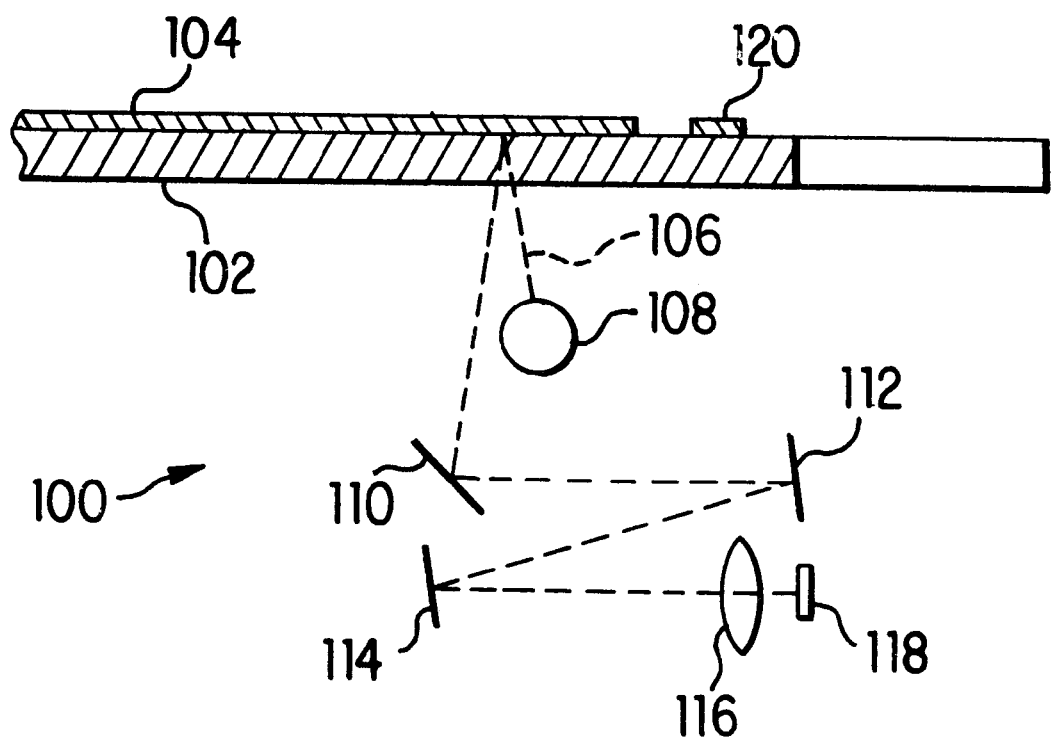
FIG. 1 is a cross-section side view of an example image scanner with a calibration target in accordance with the invention.

FIG. 1 illustrates part of an example image scanner 100. The scanner 100 includes a transparent platen 102. A document 104 to be imaged is placed face down on the transparent platen. A light ray 106 originates from a lamp 108, is reflected off the face of the document, and then is reflected off mirrors 110, 112 and 114, passes through a lens system 116 and finally onto a photosensor array 118. Other configurations are common. In general, lens system 116 may comprise multiple elements. In a scanner in accordance with the invention, the optical performance of the lens system 116 is characterized within the scanner, and the scanner partially compensates for lens aberrations using digital image processing. Of particular interest is a lens calibration target 120. Target 120 is preferably placed so that calibration patterns on the target are at the same focal plane as the face of the document, and target 120 is preferably placed so that it does not interfere with imaging the document 104.

Figure 2:
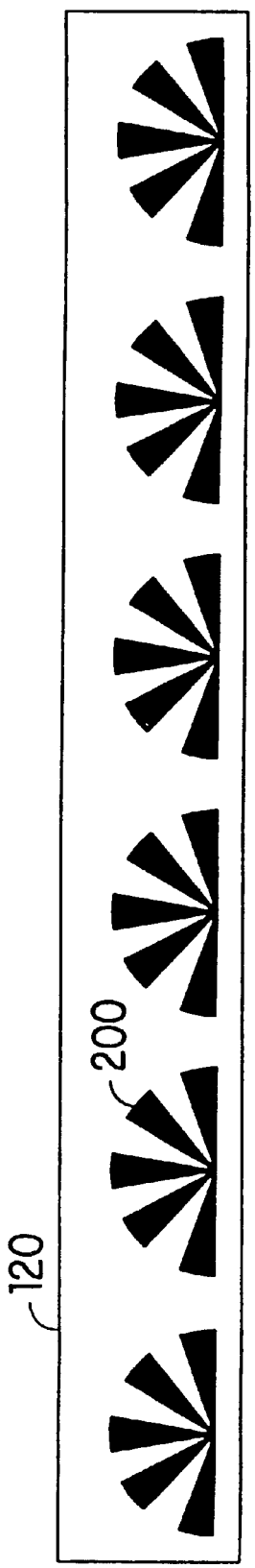
FIG. 2 is a plan view of an example calibration target.

FIG. 2 is an example embodiment of target 120. Target 120 is preferably at least as wide as the widest document that can be scanned by scanner 100. In the example embodiment of FIG. 2, there are six identical patterns 200, each of which is a semicircular array of alternating black and white radial wedges. The choice of the number six is for convenience of illustration only, and an actual target may have fewer than six patterns, or more than six patterns, depending on the requirements of the lens system.

For each pattern on target 120, because of aliasing, each black to white (and white to black) transition in intensity should not be a true step function, but instead should be rapid, with a known rate of change, and ideally the modulation transfer function of the target should be known. Each intensity transition edge can be averaged along its radial extent to reduce noise. An edge-spread function can be computed for each edge. The resulting edge-spread function can be differentiated to produce a one-dimensional component of the point-spread function at one particular angle. See, for example, Kenneth R. Castleman, *Digital Image Processing*, Prentice Hall, 1996, chapter 16. If the point-spread function is circularly symmetrical then a one-dimensional point-spread function computed from a single edge can be rotated to produce the two-dimensional point-spread function. However, in general, edges at many orientations may be needed to accurately determine the two-dimensional point-spread function.

Figure 3:
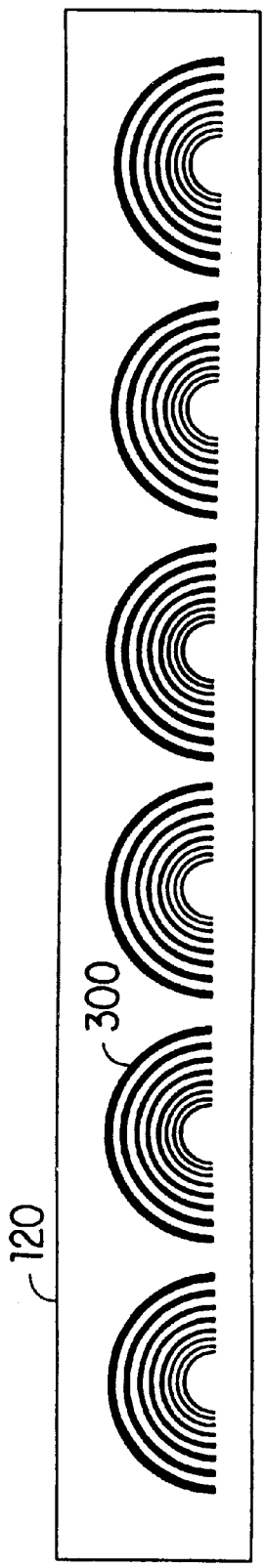
FIG. 3 is a plan view of an alternative calibration target.

FIG. 3 illustrates an alternative target pattern. In FIG. 3, the targets are concentric rings. Concentric rings enable measurement of an edge-spread function at any arbitrary angle, with multiple transitions to enable averaging to reduce noise.

Instead of a series of discrete calibration patterns as illustrated in FIGS. 2 and 3, an alternative calibration target can have a continuous random two dimensional pattern. For example, a suitable pattern in the spatial domain may be obtained by taking the two-dimensional inverse Fourier transform of a two-dimensional spectrum having constant amplitude and random phase. The cross-correlation of the known random pattern and the scanned image of the pattern is the point-spread function of the system. The random pattern can be logically divided into variable sized sections as needed to determine the point-spread function over various segments of the scan line.

When using the point-spread function for compensation, the lens system is assumed to be a linear system. Given an original image f(x,y) and the spatial domain point-spread function of the lens system h(x,y), the resulting scanned image g(x,y) is:

$$g(x,y) = h(x,y) * f(x,y)$$

where "*" indicates two-dimensional convolution. The discrete form is as follows:

$$g(x, y) = \sum_{m} \sum_{n} h(x-m, y-n) f(m, n)$$

Given the scanned image g(x,y), and given h(x,y), then the original image is restored (blurring is reduced) by deconvolution:

$$f(x,y) = s(x,y) * g(x,y)$$

where s(x,y) is a spatial domain kernel (deconvolution matrix, or inverse filter) computed from h(x,y), and perhaps modified to also incorporate a desired point-spread function. Given the system point-spread function h(u,v) in the frequency domain, s(x,y) may be computed by computing the inverse Fourier transform of 1/(h(u,v)). Alternatively, given the spatial domain point-spread function h(x,y), then s(x,y) may be computed by solving a series of simultaneous equations;

Alternatively, instead of expressly computing s(x,y), f(x, y) may be computed directly by iteration. See, for example, Michael Elad and Arie Feuer, "Restoration of a Single Superresolution Image from Several Blurred, Noisy, and Undersampled Measured Images," *IEEE Transactions on*

*Image Processing*, vol. 6, no. 12, pp 1646–1658, December, 1997. Using a Steepest Descent algorithm, the following iterative equation may be used.

$$f_{j+1} = f_j + \mu h^T[g - hf_j]$$

where h is the spatial domain point-spread function as defined above, $f_{-0}$, the initialization vector can be any vector, and where $\mu > 0$ is small.

One advantage of the iterative approach is that point-spread function compensation can be combined with two-dimensional resampling. Often, the desired scanned image may have a sample rate that is less than the highest possible optical sampling rate. High resolution color images require a lot of memory, and image analysis or transmission over a communications channel may require a substantial amount of time. Accordingly, an operator may choose a lower sampling rate to reduce memory, processing time, or transmission time. An image may need to be scaled to fit within a frame in a document or display, with a sampling rate that is determined by the resolution of a printer or display device. As a result, the desired sampling rate may be any arbitrary number. Finally, in some scanning configurations, scanning time may be reduced if sampling rate is reduced. Scanning time is often limited by an exposure time per pixel which is required to obtain a particular signal-to-noise ratio. Charges for adjacent CCD elements may be combined to enable a faster, but lower sampling rate, scan.

For any of the above reasons, scanner operators often request some fraction of the highest optical sampling rate. Typically, samples for a single scan line are read by the scanner at the highest optical sampling rate, intermediate interpolated samples are computed, and the desired sampling rate is obtained by resampling the interpolated samples. For example, a scanner may have a 1,200 pixel per inch optical sampling rate, and may interpolate to 4,800 pixels per inch, and then resample the 4,800 pixels per inch samples to provide an image having 938 pixels per inch (where 938 is just an arbitrary example for illustration). For scanners having a moving linear sensor array, interpolation and resampling may provide an arbitrary resolution along the scanline, and resolution in the direction of scanning may be controlled by the translation speed of the sensor array. Alternatively, bilinear interpolation may be used to compute a pixel value using the intensities of the four closest neighboring sensor values. However, as discussed in the article by Elad referenced above, compensation for blurring (by using the point-spread function) and two-dimensional resampling may be combined in the iterative approach.

While there are advantages to the iterative approach as discussed above, many scanners have specialized hardware support for spatial domain kernel operations. Accordingly, in the following discussion, the kernel approach is used for illustration. In general, the point-spread function is only part of the information used to compute the kernel.

Computation of kernels from edge-spread data may be performed within the scanner. Alternatively, for peripheral devices, edge-spread data may be uploaded to a host computer. The host computer may then compute the kernels and download the kernels to the scanner. An image scanner may also need to convolve an image with other kernels, for example, for image sharpening. The various kernels can be convolved together, and the resulting combined kernels can be applied to the scanned image data. Some kernel information may be determined by a host computer. For device independence, the scanner may need to upload internal scanner kernel information to the host computer. The host computer may then convolve scanner specific kernels with kernels determined by the host computer and download the resulting combined kernels to the scanner. See, for example, U.S. patent application Ser. No. 08/775,061. In accordance with the present invention, the scanner may upload edge-spread data to the host computer in addition to other kernel information.

With N patterns, the scan line is divided in N regions, and the point-spread function is assumed to be constant within each region. For each region, a convolution kernel is computed from the corresponding point-spread function and desired modulation transfer function. The kernel size is preferably greater than the extent of any blurring. For example, a kernel of nine-by-nine values may be used if blurring of one pixel does not extend beyond 4 pixels in any direction. For each region, in the spatial domain, a convolution kernel is used to operate on each pixel within the region. Pixels near the document edges may remain unfiltered, or edges may be extended using null data to enable filtering to extend to the edges. If optics compensation kernels are convolved with other kernels, then the optics compensation kernel that is convolved with other kernels will be dependent on the region being scanned.

Figure 4:
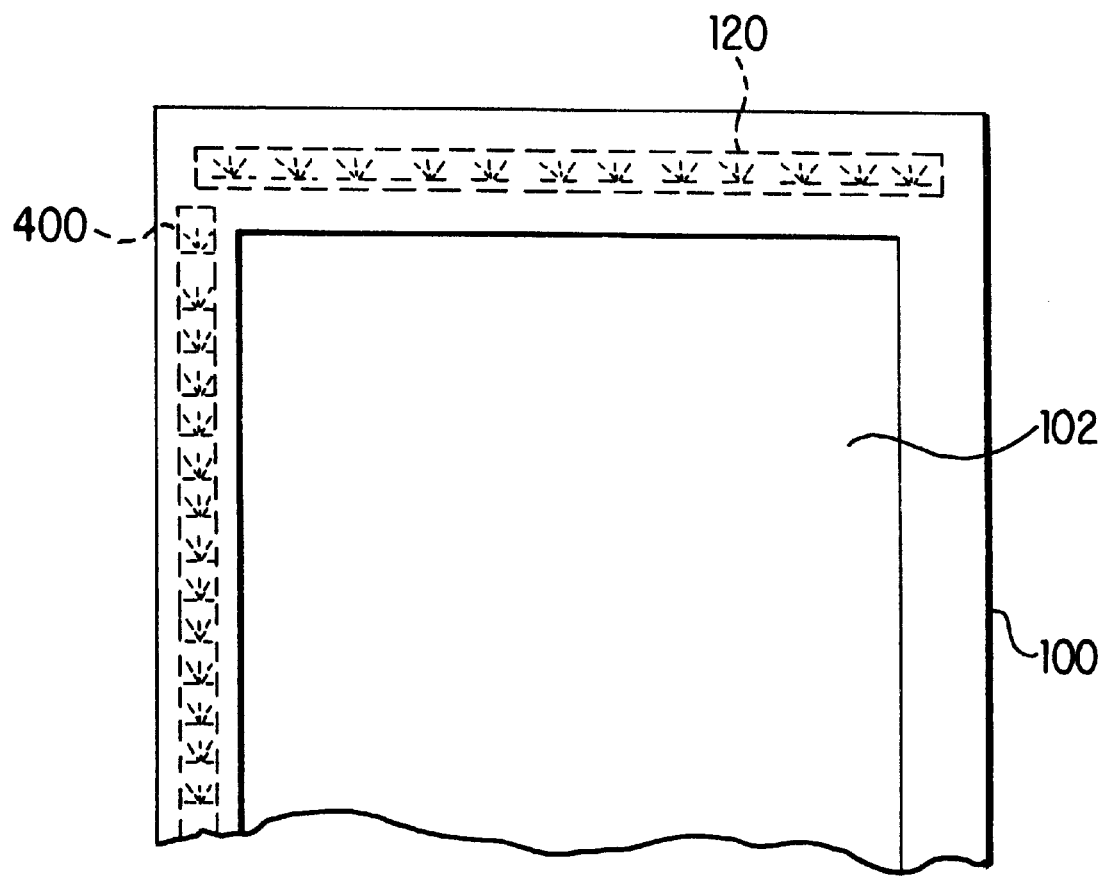
FIG. 4 is a top view of the scanner of FIG. 1 illustrating additional targets alongside a document.

FIG. 4 is a top view of a scanner illustrating additional calibration patterns alongside a document. FIG. 4 shows patterns 400 on only one side of the document, but they may also be placed on both sides of the document. If temperature change is relatively rapid during a scan, the point-spread functions computed before the scan may become inappropriate. Additional patterns alongside a document enable checking to see if at least one of the point-spread functions is changing during the scan. For purposes of monitoring for change, it may not be necessary to compute an entire point spread function. It may be sufficient, for example, to monitor one edge-spread function at one angle. If the measured function is changing in real time, and if the lens system changes consistently, monitoring patterns as in FIG. 4 may provide sufficient information to permit real time modification of the point-spread functions. Alternatively, the scanner may simply go back to the beginning, and recalibrate and rescan.

Incorporating calibration targets within a scanner also facilitates compensation for operater controlled variables, including resolution and motion blur. If there is continuous relative movement between a sensor array and a document being scanned, some blur results from movement during the exposure time for each pixel. If the amount of motion is known, then motion blur can be incorporated into the compensation kernel. See, for example, the article by Elad referenced above. In many scanners, the optical sampling rate in a direction perpendicular to a scan line is determined by the speed of the relative scanning motion. For example, if an operator asks for a high resolution, the relative scanning motion is relatively slow, and if an operator asks for a low resolution, the relative scanning motion is relatively fast. With calibration patterns internal to the scanner (as in FIGS. 2 and 3), the patterns should be scanned at the (X,Y) resolution specifed by the operator. Then, image specific resolution and motion blur become inherent to the calibration process.

In summary, providing multiple calibration target patterns within a scanner enables use of a lower cost lens system, where the lens system may have optical characteristics that may vary from lens to lens and may vary with temperature and time. In addition, providing calibration target patterns within a scanner facilitates computation of image specific compensation (for example, specific (X,Y) resolution and motion blur). In addition, no ROM is required to store extensive tables of predetermined point-spread data.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of scanning an image using an image scanner, comprising:
   scanning, through an optical system, a plurality of optical calibration patterns within the scanner;
   computing a point-spread function from each scanned optical calibration pattern;
   scanning an image to obtain a scan line of image pixels; and
   using each point-spread function to modify a corresponding region of the scan line, to remove some aberrations caused by the optical system.

2. The method of claim 1, the step of using each point-spread function further comprising:
   computing a spatial domain digital kernel from each point spread function; and
   convolving each digital kernel with a portion of the image pixels corresponding to a region of the scan line.

3. The method of claim 1, the step of using the point-spread function further comprising:
   iterating an equation that modifies the image pixels to form a new image, with some aberrations, caused by the optical system, removed.

4. The method of claim 1, the step of scanning a plurality of optical calibration patterns further comprising:
   scanning the plurality of optical calibration patterns at an operator selected resolution.

5. The method of claim 1, the step of scanning a plurality of optical calibration patterns further comprising:
   scanning the plurality of optical calibration patterns at an operator selected scanning speed.

6. A method of monitoring an optical system in an image scanner, comprising:
   determining, before scanning an image, a first point-spread function of the optical system;
   scanning, through the optical system, an image to obtain image pixels;
   scanning, through the optical system, while scanning the image, at least one of a plurality of optical calibration patterns within the scanner;
   computing at least part of a second point-spread function from one of the optical calibration patterns that have been scanned during scanning the image; and
   comparing the second point-spread function to the first point-spread function to determine whether the optical system has changed.

7. An image scanner comprising:
   an optical system, and
   a plurality of optical targets, within the scanner, each optical target suitable for determining a point spread function for a portion of a field of view of the optical system.

8. A image scanner comprising:
   an optical system; and
   a plurality of optical targets, within the scanner, each optical target suitable for determining a point spread function for a portion of a field of view of the optical system, each optical target positioned in a location so that each optical target may be used to monitor the point spread function during the scan.

* * * * *